(12) United States Patent
Hermey et al.

(10) Patent No.: US 12,379,014 B2
(45) Date of Patent: Aug. 5, 2025

(54) LINE GUIDING SYSTEM WITH SIMPLIFIED GUIDING DEVICE FOR TRANSVERSE STABILIZING AND ADD-ON MODULE THEREFOR

(71) Applicant: IGUS GMBH, Cologne (DE)

(72) Inventors: Andreas Hermey, Hennef (DE); Joerg Dommnik, Neunkirchen-Seelscheid (DE)

(73) Assignee: IGUS GMBH, Cologne (DE)

( * ) Notice: Subject to any disclaimer, the term of this patent is extended or adjusted under 35 U.S.C. 154(b) by 273 days.

(21) Appl. No.: 17/760,035

(22) PCT Filed: Jan. 28, 2021

(86) PCT No.: PCT/EP2021/052045
§ 371 (c)(1),
(2) Date: Aug. 3, 2022

(87) PCT Pub. No.: WO2021/156141
PCT Pub. Date: Aug. 12, 2021

(65) Prior Publication Data
US 2023/0042568 A1 Feb. 9, 2023

(30) Foreign Application Priority Data
Feb. 4, 2020 (DE) ...................... 20 2020 100 606.1

(51) Int. Cl.
*F16G 13/16* (2006.01)
*F16G 3/16* (2006.01)
(Continued)

(52) U.S. Cl.
CPC .............. *F16G 13/16* (2013.01); *F16L 3/015* (2013.01); *H02G 3/0475* (2013.01); *H02G 11/006* (2013.01)

(58) Field of Classification Search
CPC . F16G 13/16; F16G 3/16; F16L 3/015; H02G 3/0475; H02G 11/006
See application file for complete search history.

(56) References Cited

U.S. PATENT DOCUMENTS 5,257,961 A 11/1993 Wehler et al.
6,156,974 A 12/2000 Blase
(Continued)

FOREIGN PATENT DOCUMENTS

CN 108350985 7/2018
DE 29511726 9/1995
(Continued)

OTHER PUBLICATIONS

English translate (KR101769434B1), retrieved date Nov. 7, 2024.*
(Continued)

*Primary Examiner* — Mohammed S. Alawadi
(74) *Attorney, Agent, or Firm* — Grossman, Tucker, Perreault & Pfleger, PLLC

(57) ABSTRACT

A line guiding system comprising an articulated line guiding apparatus which, for guiding supply lines between two connection points that are movable relative to each other, is curved about a deflection axis extending in a transverse direction transverse to the longitudinal direction, and a separate guiding device for guiding the line guiding apparatus along at least a section of the travel path. The guiding device comprises at least one guide strand, which is arrangeable for predefining a desired course of the section of the travel path. The line guiding apparatus comprises external profile regions, which are arranged for lying against and/or on the guide strand and are shaped with a profile shape for a transversely stabilizing guiding against or on the guide strand by projecting and/or recessed interengagement of guide strand and profile shape to counteract a lateral devia- (Continued)

tion of the movable line guiding apparatus in the transverse direction.

20 Claims, 3 Drawing Sheets

(51) Int. Cl.
*F16L 3/015* (2006.01)
*H02G 3/04* (2006.01)
*H02G 11/00* (2006.01)

(56) References Cited

U.S. PATENT DOCUMENTS

2015/0330479 A1* 11/2015 Kemper ............ F16G 13/16
                                              700/275
2018/0320757 A1* 11/2018 Tetsuka ............ F16G 13/16

FOREIGN PATENT DOCUMENTS

| DE | 29607228 | 6/1996 |
| DE | 19512086 | 8/1996 |
| DE | 29904796 | 7/1999 |
| DE | 202012010236 | 11/2012 |
| EP | 0879367 | 6/1999 |
| JP | 11-205985 | 7/1999 |
| JP | 2017-089848 | 5/2017 |
| JP | 2020-16279 | 1/2020 |
| KR | 101769434 B1 * | 8/2017 |

OTHER PUBLICATIONS

International Search Report from corresponding PCT Appln. No. PCT/EP2021/052045, dated Apr. 22, 2021. English translation attached.
International Preliminary Report on Patentability from corresponding PCT Appln. No. PCT/EP2021/052045, dated May 16, 2022.
"Sparen auf langen Verfahrwegen, selbstfuehrende e-keten", Nov. 7, 2016, pp. 968-997. Autoglide Product Information. Igus, DE, Retrieved from the Internet: https :/ /www .igus.de/iProsvc/Download.aspx ?File=P0 1100900DEde.pdf&Name=Serie%2520AG200.pdf. No translation available, however, concise explanation of relevancy can be found on the International Search Report submitted herewith.
Office Action from related Japanese Appln. No. 2022-545958, dated Dec. 24, 2024. English translation attached.
Office Action from related Taiwanese Appln. No. 110104151, dated Dec. 12, 2024. Partial English translation attached.

* cited by examiner

LINE GUIDING SYSTEM WITH SIMPLIFIED GUIDING DEVICE FOR TRANSVERSE STABILIZING AND ADD-ON MODULE THEREFOR

FIELD

The invention relates to a line guiding system comprising a line guiding apparatus for guiding supply lines and a separate guiding device for guiding the line guiding apparatus. The line guiding apparatus here guides the lines, such as e.g. cables, hoses or the like, from a first to a second connection point, of which at least one connection point is movable relative to the other along a travel path. The separate guiding device on the other hand serves to guide the line guiding apparatus along at least a section of the travel path.

The line guiding apparatus is understood in the present case to mean a line guiding apparatus for the dynamic guiding of supply lines to supply a movable consumer with energy and process fluids. A line guiding apparatus of this type is typically formed in an articulated manner such that the line guiding apparatus can be turned around or deflected to form two opposite runs—a first and a second run—and a deflection curve connecting them. During travel, the deflection curve connecting the runs is movable between the ends of the line guiding apparatus or the connection points thereof. The deflection curve here is curved about a deflection axis, with the deflection axis extending in a transverse direction transverse to the longitudinal direction. The longitudinal direction corresponds to the direction of the longitudinal extension of a run. One of the runs is typically stationary and the other movable.

BACKGROUND

Energy chains, which are known per se, are a particularly widespread type of these dynamic line guiding apparatuses.

To counteract a deviation from the desired travel path, in particular in the case of long travel paths, generic systems can in turn be furnished with separate guiding devices for guiding the line guiding apparatus itself along at least part of the travel path.

To this end, various guiding devices are already known, which are configured e.g. as guide troughs with parallel side walls extending in a longitudinal direction. In guide troughs, one or both runs of a line guiding apparatus, in particular of an energy chain, are retained and guided between the side walls.

Guiding devices of this type with guide troughs are robust, but relatively complex to install and expensive to produce. The mutually opposite side walls of the guide trough must be aligned parallel to each other along the longitudinal direction and fastened to a supporting structure, e.g. to C-profiles, which are arranged transverse to the longitudinal direction. The side walls are typically made up of a plurality of L-shaped steel plates arranged adjacently end-to-end, which are generally fastened to the supporting structure by angle brackets and bolted connections, as described e.g. in DE 195 12 086 C1 or in DE 295 11 726 U1. Side walls of a guide trough can support glide rails on the inside against which the one and/or the other run glides, and which are fastened on the side walls by bolted connections. Side walls of a guide trough counteract a lateral outward deviation of the line guiding apparatus, i.e. in the above-mentioned transverse direction, by guiding the outer main sides of the lateral link plates. The outer main sides of the lateral link plates may abut against the side walls of the guide trough during travel of the chain or may glide over them laterally.

SUMMARY

An object of the present invention consists in proposing a simplified line guiding system, which is in particular more cost-effective to produce and simpler to install.

In the line guiding system it is proposed, according to the invention, that the guiding device comprises at least one guide strand, which can be arranged to predefine a desired course of the section of the travel path, and that the line guiding apparatus comprises external profile regions that are shaped with a profile shape for transversely stabilizing guiding against or on the guide strand by projecting and/or recessed interengagement of the cross-sections of guide strand and profile shape.

The interaction of the profile regions with the separate guide strand makes it possible to counteract a lateral deviation of the movable line guiding apparatus from the predefined course of the section of the travel path in the transverse direction. Thus, in particular, distinct side walls are unnecessary, i.e. associated costs and installation effort are superfluous. The profile regions can in particular be arranged externally on the line guiding apparatus to lie against and/or on the guide strand.

The arrangement of the profile regions on the line guiding apparatus here can in particular be selected such that, in the installed or operational state of the system, the profile regions are placeable on the guide strand, in particular on the upper side of the guide strand, to achieve the transversely stabilizing interaction of the profile regions with the guide strand.

To this end, the profile regions are preferably provided on a side of a run facing towards the deflection axis or the respective opposite run, and/or on a side of a run facing away from the deflection axis or the respective opposite run, for interacting with the at least one guide strand. The interaction with the at least one guide strand can thus occur inherently during travel as a result of weight. The guide strand here can act as a type of bearing with a supporting and, at the same time, guiding or directional action. However, a support function is not necessary or crucial for transverse stabilizing.

The profile regions each have a profile shape that allows a transversely stabilizing engagement of the particular profile region with the guide strand and keeps the line guiding apparatus on the desired course in a lateral direction. A projecting and/or recessed interengagement of the cross-sections of guide strand and profile shape is understood here to mean both a convex engaging of the guide strand in an at least partially concave profile shape, and conversely an engaging of a partially convex profile shape in a guide strand that is partially concave in cross-section, and furthermore also a combination of convex-concave engagement of correspondingly convex and concave cross-sections of both parts.

During travel, at least some profile regions of a longitudinal portion of the line guiding apparatus or of at least one run are in each case in engagement with the guide strand, which is arranged or fastened along the desired travel path. This results in a predetermined or desired alignment of the line guiding apparatus on the guide strand. The interaction of profile regions and guide strand counteracts a lateral deviation of the line guiding apparatus from the desired course in the transverse direction. A lateral supporting of the line guiding apparatus by side walls of a guide trough is thus unnecessary, and a typical guide trough does not have to be provided. As a result, production and installation costs can be reduced.

A central idea of the invention consists in proposing a guide strand with a structurally particularly simple design, which interacts with corresponding profile regions on the line guiding apparatus so as to keep it on track.

The guide strand can in particular be in the form of a rope, rod, profile bar or in a similar structural shape with a comparatively small cross-section compared to the line guiding apparatus, but a similar longitudinal extension, in particular over at least half the total length of the line guiding apparatus. The guide strand can be aligned or fastened to predefine a desired course of the section of the travel path.

The profile regions of the line guiding apparatus are formed such that in cross-section they are preferably complementary to the cross-section of the corresponding interacting guide strand, and in particular concave.

The profile regions of the line guiding apparatus can in particular be furnished with two lateral retaining surfaces—similar to lateral guide surfaces—to limit a freedom of movement of the particular profile region relative to the guide strand in the transverse direction. The profile regions do not have to be in constant contact with the guide strand during travel in order to achieve transverse stabilizing.

The profile regions, seen in cross-section, can each be formed so as to partially engage around the guide strand or to grip part of the perimeter thereof. In combination with two parallel guide strands, profile regions with only one retaining surface that retains laterally or in a transverse direction—similarly to a rail track—are also possible.

At least some of the profile regions can each have at least one axially and radially open depression extending in the longitudinal direction with a cylindrical inner wall, in the general geometric sense, and preferably with a partially circular cross-section. A cylindrical inner wall is understood in general to mean a wall that extends parallel to a longitudinal axis.

The profile regions preferably have an approximately or exactly constant cross-section perpendicular to the longitudinal direction. The guide strand also preferably has a cross-section perpendicular to the longitudinal direction that is substantially constant along the usable longitudinal extension.

The at least one guide strand is in particular arrangeable in a linearly extending manner and, in an installed operational state, can be arranged in a linearly extending manner to predefine a linear course of the section of the travel path or to counteract deviations of the line guiding apparatus from straight running. A curvilinear course of the travel path of a line guiding apparatus is likewise within the scope of the invention.

In one embodiment, the profile regions can be provided as components of separate add-on modules that are fastenable to the line guiding apparatus. In this way, existing line guiding apparatuses can be retrofitted or converted for use as part of the line guiding system described here. The add-on modules can therefore provide the line guiding system with modularity. The add-on modules can be produced from plastic in one or more parts.

In one embodiment, the guiding device has a longitudinal portion with at least one supporting guide strand, which is arrangeable for supporting at least part of the load of the line guiding apparatus and in particular for supporting the upper or moving run. The upper run can be guided on the supporting guide strand or guide strands with a vertical spacing or with a spacing in the height direction from a bearing surface of the lower run, with the profile regions of the upper run preferably being supported in a load-transmitting manner on the guide strand or guide strands. The load is preferably transmissible by the profile regions to the at least one guide strand, which acts e.g. in the manner of a support rail.

The at least one guide strand is preferably configured such that it is continuous, in particular in one piece, along the section of the travel path.

The at least one guide strand can be formed as a profile bar or elongate profile strand, which is fastenable or fastened to a structure with a provided installation surface or support surface along the travel path. In principle, any bar-shaped, rod-shaped or tube-like, substantially flexurally rigid guide strands can be used in which the cross-sectional shape allows the desired interaction with the profile regions.

In a particularly preferred embodiment, however, the at least one guide strand is configured as a tensionable, flexible structure, in particular a rope, wire, cord or the like, which is capable of being clamped along the travel path. Embodiments with a tensionable, rope-like guide strand are particularly simple and quick to assemble, since a rectilinear course is inherently achieved by clamping between two end points.

The outer contour of the cross-section of the guide strand is preferably convex in the geometric sense, preferably smoothly convex (without corners and edges) to avoid abrasive edges or interfering edges.

The guiding device in one embodiment comprises two guide strands, which are installable or are installed parallel to each other. The two guide strands can preferably be arranged such that they are spaced apart from each other in the transverse direction, which is advantageous for good guiding and increased mechanical stability of the line guiding system, in particular in the case of load-bearing guide strands.

The guiding device preferably comprises at least one fastening device for the guide strand. In an operational state, the at least one guide strand can be fastened at least at its ends, or in its end regions, by a fastening device in each case, e.g. on the provided installation surface. The at least one guide strand can in particular be fastened only at its ends by a fastening device in each case, and can preferably be tensioned between the fastening devices, particularly if it is configured as a rope, wire, cord or the like. With guide strands that are constructed in one piece in particular, time and/or costs can be saved in the final installation.

The guide strand can also be configured in a plurality of pieces and can in particular be composed of consecutive, separate strand portions arranged one adjacent to the other.

The line guiding apparatus can comprise a plurality of chain links or segments each connected together in an articulated manner. If the guide strand is made up of a number of separate longitudinal portions, the longitudinal extension of a longitudinal portion of the guide strand should preferably be a multiple of the longitudinal extension of a chain link or segment of the line guiding apparatus in each case. This allows a comparatively rapid installation of the guide strand from just a few parts, in particular identical parts.

The at least one guide strand can be configured integrally or in one part with an installation surface or support surface and can e.g. project therefrom or can be inset therein as a track.

In one embodiment, the guiding device can form two guide planes, each for one of the runs in each guide plane.

Each of the guide planes in this case can have at least one guide strand, preferably at least two guide strands. The guide planes can be spaced apart from each other in a height direction perpendicular to the longitudinal direction and perpendicular to the transverse direction, or vertically. In particular in the guide plane for the upper run in this case, the guiding device can act with the two guide strands as a rail track, which has a load-bearing and a directionally guiding function at the same time.

The line guiding apparatus is preferably an energy chain, which is configured in a link chain construction. Energy chain can in this case comprise the two opposite strands of lateral link plates and crossbars connecting these in the transverse direction, the lateral link plates of one strand being connected together in pairs in an articulated manner.

In a preferred embodiment, the line guiding system comprises add-on modules for retrofitting the energy chain with the profile regions. The add-on modules can each have at least one profile region and can be formed for fastening on a crossbar and/or a lateral link plate. The add-on modules can in particular be lockable with a crossbar and/or with a lateral link plate. This has the advantage that existing energy chains can be retrofitted for a system with a guide strand or guide strands.

Alternatively or in addition, at least some of the crossbars and/or at least some of the lateral link plates can each have at least one integrated profile region for interaction with the guide strand.

The add-on modules can in particular be arranged externally on the remote side of the energy chain facing away from the opposite run in each case or facing away from the deflection axis of the deflection curve.

In one embodiment, the add-on modules are provided on the facing away side of the energy chain, i.e. the side facing away from the opposite run in each case or facing away from the deflection axis of the deflection curve.

Pairs of support skids provided laterally on the outside can be provided, in particular support skids that are integral with the add-on modules, said support skids being spaced apart from each other and from the profile regions in the transverse direction. The support skids can in particular counteract a tilting about the longitudinal direction. This embodiment can in particular be advantageous when the line guiding system for a certain portion or one of the runs only comprises one guide strand, e.g. a centrally arranged guide strand.

In one embodiment, the guiding device comprises a first pair of parallel guide strands in the form of profile bars for guiding the stationary run, which can in particular be the lower run, and a second pair of parallel guide strands in the form of profile bars for guiding and supporting the movable run, which can in particular be the upper run. Each run in this case can have first profile regions arranged in pairs and symmetrically in cross-section, each facing away from the opposite run, and second profile regions arranged in pairs and symmetrically in cross-section, each facing towards the opposite run, wherein first profile regions can interact with the first pair of profile bars and second profile regions can interact with the second pair of profile bars.

In one embodiment, the add-on module can have both profile regions facing towards the opposite run or the deflection axis and profile regions facing away from the opposite run or the deflection axis, in particular with the profile regions facing towards the opposite run or the deflection axis each being configured for guiding the upper run on at least one guide strand, preferably on a profile bar.

The guiding device can have at least one guide strand configured as a profile strand, preferably with a profile cross-section that can interact with the profile regions of the line guiding apparatus by alternating projecting and recessed intermeshing.

According to an independent aspect of the invention, the guide strand can be configured as an elongate profile part, in particular a plastics profile, which is shaped with a suitable cross-section for a transversely stabilizing interaction with a design of energy chains that is known per se according to the principle from EP 0 879 367 B1. The plastics profile in this case replaces part of the lower run and, instead of the construction with a so-called end feed, which requires an excess length of the lower run for guiding purposes, it allows a more cost-effective construction with an energy chain that is up to 50% shorter (and so-called middle feed).

In particular but not exclusively in combination with the last-mentioned aspect of the invention, the line guiding apparatus can preferably have a plurality of comb-like projections extending in the longitudinal direction on the side of each run facing the opposite run in each case, to allow the comb-like projections of the two runs to mesh with each other during travel of the one, upper run on the other, lower run in order to keep the two runs together against a transverse shift relative to each other or laterally. This embodiment permits an additional transverse stabilizing transverse to the longitudinal direction.

In one embodiment, the first or fixed connection point can be arranged at a longitudinal end of the travel path (so-called end feed), in which case the upper or movable run can travel from one longitudinal end of the travel path to the other longitudinal end of the travel path supported on the lower or stationary run, in particular in a gliding manner (so-called gliding arrangement). In this case a combination with the comb-like projections described above is advantageous, since the upper run can be retained on the lower run against a transverse shift. In such an embodiment it is sufficient for only the lower run to be guided laterally by a guide strand.

In a further embodiment, the first or fixed connection point can be arranged in the central region between the two longitudinal ends of the travel path (so-called middle feed), wherein the upper or movable run travels along only for instance a first part, in particular a first half, of the travel path supported on the lower or stationary run, possibly being retained on the lower run by comb-like projections against a transverse shift. In this embodiment, a guide strand can be provided for guiding the upper run along the further part or further second half of the travel path. This guide strand for the upper run is arranged between the fixed connection point and the second longitudinal end of the travel path. This guide strand is preferably arranged with a vertical spacing from the bearing surface of the lower run in this case.

As a further development of the above embodiment, it can be provided that at least one further guide strand is provided for guiding or for transversely stabilizing the lower run. In an advantageous embodiment, this lower guide strand for guiding the lower run can at the same time secure the first-mentioned, upper guide strand for the upper run against a transverse shift, in particular by a form-fitting connection in cross-section.

In one embodiment, the lower run can be guided by interaction of an allocated guide strand, in particular by a tensioned rope or the like, with profile regions that are arranged externally on the remote side of the energy chain facing away from the opposite run in each case.

Alternatively or in addition, the upper run can be guided by interaction of the guide strand, which is configured as a profile strand, or of a plurality of profile strands with the comb-like projections.

In one embodiment, a guide strand for the upper run, which is configured as a profile strand, can be retained laterally on the rope-like guide strand for the lower run such that, in the installed operating state, the upper run is guided by interaction of comb-like projections on the profile strand. The comb-like projections on the profile strand can be configured integrally or in one part with this profile strand and such that they are complementary in cross-section to corresponding comb-like projections of the energy chain. In this embodiment the lower run is preferably guided by a tensioned rope.

The invention further relates to an add-on module for an energy chain, which is formed for fitting to a crossbar and/or to a lateral link plate of a chain link and comprises at least one profile region, the add-on module being configured for interacting with at least one transversely stabilizing guide strand, wherein each profile region is formed so as to be externally arranged and complementary to a rope- or bar-like guide strand and comprises at least one depression, in particular with a partially cylindrical inner wall. For simple, tool-free fastening, the add-on module can in particular be shaped so as to be lockable with the crossbar and/or the lateral link plate.

The profile region of the add-on module is externally accessible and can in particular be arranged on the inner radius, i.e. on a side facing towards the deflection axis or the opposite run in each case or conversely, depending on the embodiment, on the outer radius, i.e. on a side of the energy chain facing away from the deflection axis or the opposite run in each case. The depressions in this case extend in the longitudinal direction of the energy chain. The add-on modules can in particular act as support skids in the upper run, which are guided on the guide strand or guide strands in a gliding manner.

In one embodiment, the add-on module comprises two lateral support skids beside the profile region, which are spaced apart from each other in the transverse direction. The support skids can be advantageous in particular when the line guiding system comprises only one guide strand, in which case the support skids support the lower run horizontally or in a tilt-resistant manner. The add-on module is preferably made of plastic, in particular in one piece, and may optionally comprise a tribopolymer with improved tribological properties.

The invention further relates to a chain link for an energy chain for a line guiding system according to one of the preceding embodiments, comprising two lateral link plates that are opposite each other in a transverse direction, each having two narrow sides extending in a longitudinal direction, and at least one crossbar connecting these lateral link plates, wherein the lateral link plates and the crossbar define a receiving space for supply lines to be guided.

The chain link comprises at least one external profile region facing away from the receiving space for interacting with at least one rope- or bar-like guide strand, each profile region being arranged on at least one of the crossbars and/or on at least one of the narrow sides of the particular lateral link plate and having a profile shape that is complementary in cross-section to the rope- or bar-like guide strand, in particular a concave, partially cylindrical, profile shape.

The profile region can be molded integrally with, and in particular molded on to, the outside of the crossbar. Alternatively or in addition, the profile region can be locked with the crossbar as a component of a separate add-on module.

The above individual features of guide strand and profile region are advantageously mutually combinable and may also be considered essential to the invention independently of one another.

BRIEF DESCRIPTION OF THE DRAWINGS

Further details, features and advantages of the invention can be taken from the following, more detailed description of preferred exemplary embodiments with reference to the annexed figures, in which, purely by way of example.

DETAILED DESCRIPTION

Figure 1A:
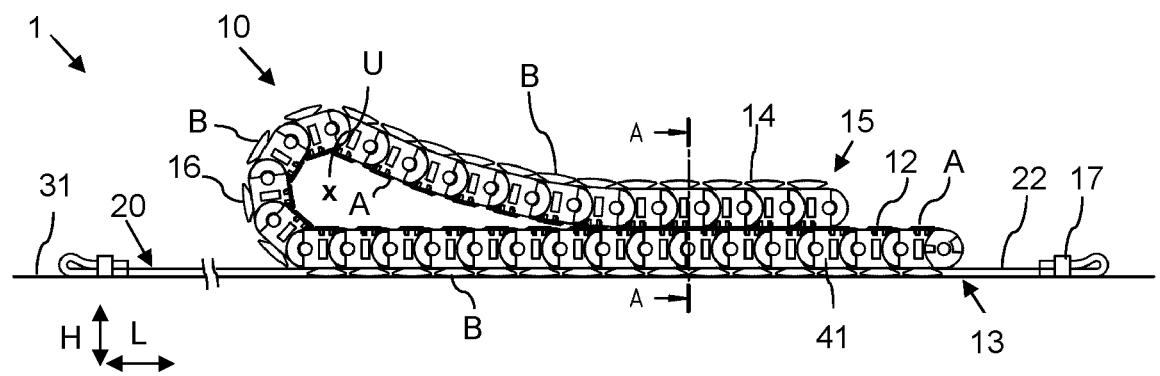
FIG. 1A, 1B: a first exemplary embodiment of the system according to the invention in side view (FIG. 1A) and in cross-section perpendicular to the longitudinal direction (FIG. 1B)
Figure 2A:
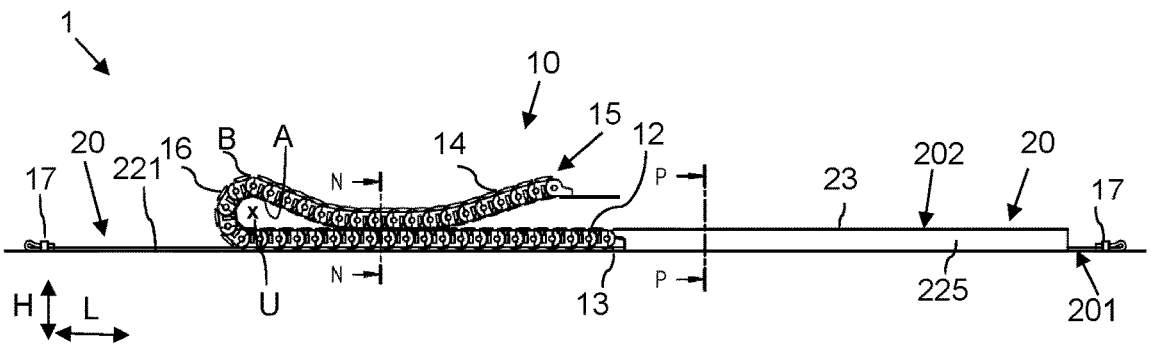
FIG. 2A-2D: a second exemplary embodiment of the system according to the invention in side view (FIG. 2A), in cross-section along N-N (FIG. 2B), in cross-section along P-P (FIG. 2C) and in perspective view (FIG. 2D)
Figure 2B:
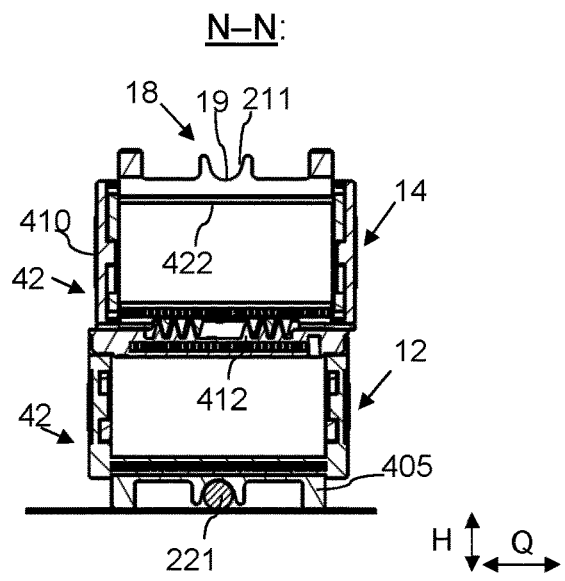
Figure 2C:
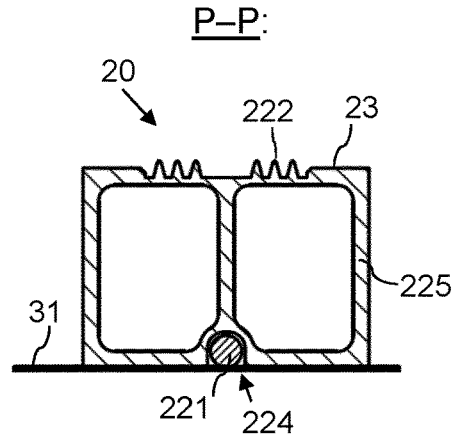
Figure 2D:
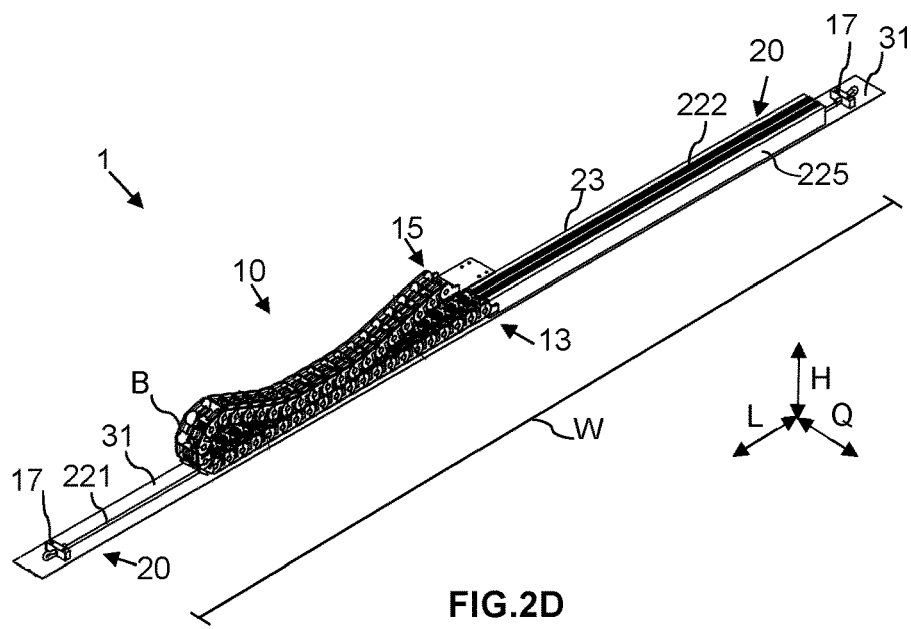
Figure 3A:
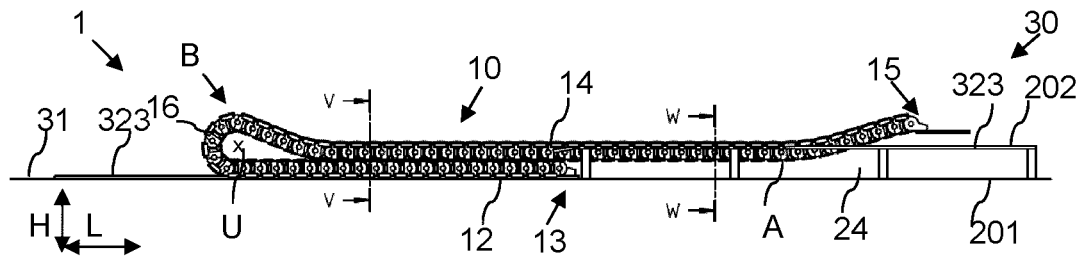
FIG. 3A-3C a third exemplary embodiment of the system according to the invention in side view (FIG. 3A), in cross-section along V-V (FIG. 3B) and in cross-section along W-W (FIG. 3C)

FIGS. 1A, 2A and 3A show a line guiding apparatus 10, which guides supply lines (not shown) from a first connection point 13 on a fixed base to a second connection point 15 on a machine to be supplied. The second, movable connection point 15 travels in a longitudinal direction L along a travel path W (shown in FIG. 2D), in a vertical plane here. The line guiding apparatus 10 forms a lower run 12 and an upper run 14 in the operational state shown. The lower run 12 is connected at its end to the fixed connection point 13 and is laid on an installation surface 31. The upper run 14 is connected to the movable connection point 15 and travels along the travel path W partially on the lower run 12 in a gliding manner. Between the two runs 12, 14 a deflection curve 16 is formed, which is curved about a deflection axis U and likewise travels along the travel path W. The deflection axis U extends perpendicularly to the plane of FIGS. 1A, 2A and 3A, horizontally here.

The line guiding apparatus 10 travels in a travel plane in which the longitudinal direction L and a height direction H lie, with a transverse direction Q extending parallel to the deflection axis U. The line guiding apparatus 10 comprises two sides A, B in the installed or operational state. The radially inner side A faces towards the deflection axis U in the region of the deflection curve 16, and in the regions of the runs 12, 14 it faces towards the opposite run 12, 14 in each case. The radially outer side B faces away from the deflection axis U in the region of the deflection curve 16, and in the regions of the runs 12, 14 it faces away from the opposite run 12, 14 in each case. The side B in the lower run 12 is supported on the bearing surface or installation surface 31.

The line guiding apparatus 10 is preferably an energy chain, which is made up of chain links 41, 42, 43, 44 that are connected to each other in an articulated or pivoting manner. A chain link 44 is shown in perspective in FIG. 4B and in cross-section in FIG. 1B, FIG. 2B and FIG. 3B. The chain link 41, 42, 43, 44 comprises two parallel lateral link plates 410, which are each spaced apart from one another and connected to one another in the transverse direction Q here by two crossbars 421, 422, 423, 424. The lateral link plates 410 of consecutive chain links 41 are pivotable relative to each other about a pivot axis, the pivot axis extending in the transverse direction Q parallel to the deflection axis U or defining this.

The line guiding system 1 in all the exemplary embodiments comprises at least one guiding device 20 with a guide strand 22, which guides the line guiding apparatus 10 along the travel path W. The line guiding apparatus 10 comprises profile regions 18 that are compatible with or shaped so as to be complementary to the guide strand 22, which engage with the guide strand 22 during the travel of the line guiding device 10 and can travel in the longitudinal direction L in engagement with the guide strand 22. Because of this interaction, the line guiding apparatus 10 remains laterally retained in the provided travel plane in which the movable connection point 15 travels, i.e. perpendicularly to the deflection axis U. To this end, the profile regions 18 form lateral retaining surfaces 111, 211, 311 of suitable geometry, which are shaped according to the selected guide strand 22. The individual profile regions 18 are arranged such that they are distributed along the length of the line guiding apparatus 10 and have a shorter longitudinal extension than the individual chain link 41, 42, 43, 44.

The profile shape of the profile regions 18 corresponds in cross-section to the cross-sectional shape of the guide strand 22, and is selected such that when the profile region 18 of a chain link 41 presses or lies against or on the guide strand 22, the profile region 18 aligns with the guide strand 22 and the chain link 41 tends towards an intended, desired orientation of the guide strand 22. In this way a deviation, e.g. from a desired straight running, is counteracted and the line guiding apparatus 10 is prevented from veering laterally out of the intended travel plane.

Figure 1B:
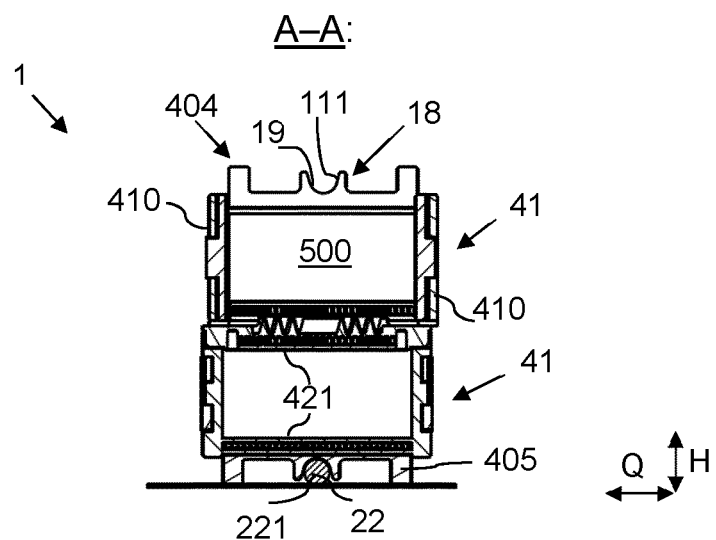

The guide strand 22 in the exemplary embodiment as in FIG. 1A, 1B is configured as a high-tensile-strength rope 221, e.g. as a steel rope or plastics rope, and has a substantially circular cross-section. The rope 221 is tensioned between two fastening devices 17, i.e. it extends in the intended travel plane corresponding to the intended travel path W of the machine to be supplied. The fastening and alignment can thus take place particularly simply using two end fastening devices 17, between which the rope 221 is tensioned. The tensioning force of the rope 221 between the fastening devices 17 is selected such that it absorbs typical transverse forces that can occur on the energy chain 10.

Figure 4A:
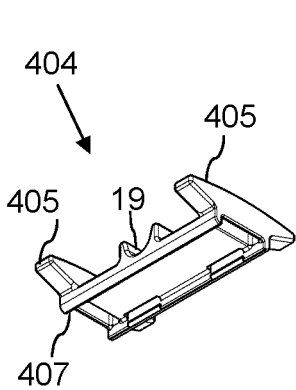
FIG. 4A-4B: an add-on module (FIG. 4A) and a chain link with the add-on module as in FIG. 4A (FIG. 4B) fitted, in a perspective illustration.
Figure 4B:
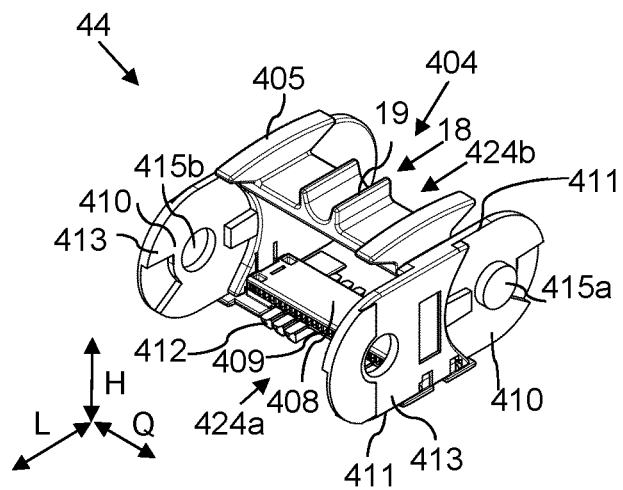

The chain links 41, illustrated in more detail in FIG. 4B, are each furnished with add-on modules 404 composed of plastic, which are locked on the side B with crossbars 421, e.g. by a plug-in clip connection. An appropriate add-on module 404 is shown individually in detail in FIG. 4A and can be produced e.g. as a one-piece injection molding. The profile regions 18 are each shaped as a depression 19, groove, trough, receptacle or the like, with a concave cross-section. The depression 19 is arranged centrally on the add-on module 404, and thus the crossbar 421, in relation to the transverse direction Q and has a semi-cylindrical inner wall with a uniform cross-section in the longitudinal direction L, here for example in the form of a semi-circular disc fitting the cross-section of the rope 221. The add-on module 404 further comprises two lateral support skids 405, one on each side of the depression 19, which are spaced apart from each other and from the profile regions 18 in the transverse direction Q. The support skids 405, which are optional depending on the shape of the profile regions 18, counteract a tilting about the longitudinal direction L on the rope 221.

The guiding device 20 in FIG. 2A-2D is constructed for action on two guide planes 201, 202. In a lower guide plane 201 the guiding action corresponds to the rope 221 shown in FIG. 1A-1C, which is clamped in a straight line between two fastening devices 17. The rope 221 guides and retains the lower run 12. The upper guide plane 202 is formed by a plurality of parallel profile strands 222, which are formed integrally with a support surface 23. The support surface 23 is spaced apart from the external installation surface 31 in the height direction H or vertically, e.g. on a machine. The profile strands 222 guide the upper run 14 further in a linear elongation of the lower run 13, and to this end they have a uniform cross-section in the longitudinal direction L which is complementary to comb-like projections 412 of the line guiding apparatus 10. The comb-like projections here can be shaped according to the teaching of EP 0 879 367 B1, which is therefore incorporated herein for the sake of brevity. The profile strands 222 are provided integrally with the support surface 23 by one or more structurally identical channel-like plastics profiles 225, which are configured such that they are compatible with the principle from EP 0 879 367 B1.

The upper run 14, starting from the deflection curve 16, initially travels on the lower run 12, with the comb-like projections 412 on the inner side A of the upper run 14 and on the inner side A of the lower run 12 meshing with one another. The upper run 14 travels past the fixed connection point 13 on to the support surface 23, which acts as a supporting running surface 212 for the upper run 14, and is guided here by the profile strands 222 and supported by the support surface 23. The guide strand 22 of the guiding device 20 comprising the support surface 23 with the profile strands 222 can be produced cost-effectively as a channel-like hollow plastics profile 225, e.g. by extrusion. On the bottom side of the plastics profile 225 facing towards the installation surface 31, a receptacle 224 is formed for a form-fitting connection with the rope 221. By means of the receptacle 224, fitting the rope 221, the hollow plastics profile 225 is secured against displacement in the transverse direction Q (see FIG. 2C).

In the exemplary embodiment as in FIG. 2A-2D, the guiding device 20 comprises both the rope 221 as a first guide strand for the lower run 12 and a second profile-type guide strand for the upper run 14, with the profile strands 222 projecting from the support surface 23. The support surface 23 here additionally has a supporting function for the upper run 14.

Figure 3B:
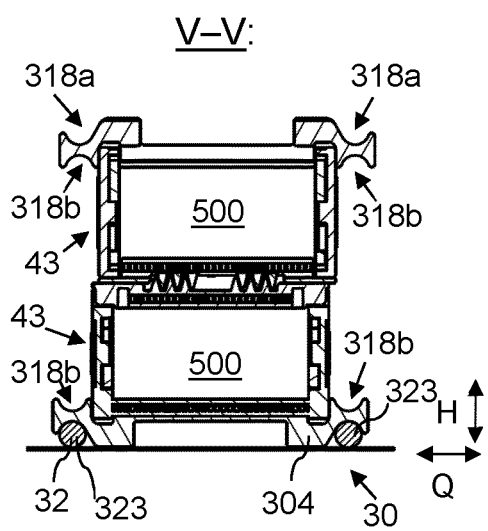
Figure 3C:
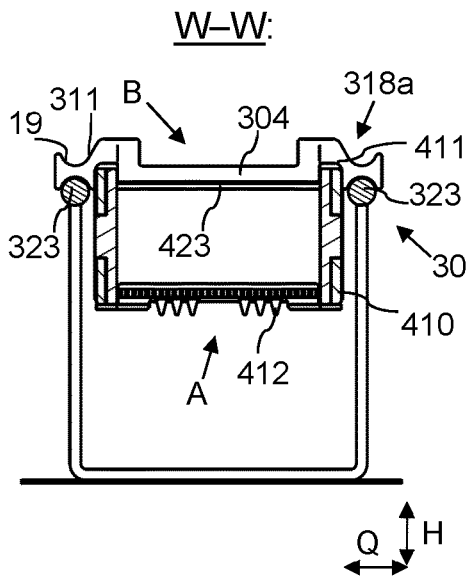

The guiding device 30 in FIG. 3A-3C likewise comprises two guide planes 201, 202, each with two parallel guide strands 32. In the example as in FIG. 3A-3C, the guide strands 32 are configured not flexibly in the manner of a rope but rigidly in the manner of a bar as profile bars 323 each having a round cross-section, which is uniform in the longitudinal direction L. The profile bars 323 can be configured e.g. as metal bars that are circular in profile. On each of the lower and upper guide planes 201, 202 there is a pair of parallel profile bars 323, which may optionally be composed of a plurality of longitudinal portions 24.

At least every nth chain link 43 of the energy chain in this example is furnished with a pair of first profile regions 318a and a pair of second profile regions 318b, which are provided on an add-on module 304. The add-on module 304 in this example, unlike FIG. 4B, is fastened over the crossbar 423 on to the narrow sides 411 of the lateral link plates 410, e.g. by a locking connection. In FIG. 3A-3C, the add-on modules 304 each comprise two pairs of profile regions 318a, 318b. The two first profile regions 318a are arranged on the radially outer side B of the energy chain and the second profile regions 318b are arranged facing away from the profile regions a on the radially inner side A of the energy chain. The spacing of the lower profile bars 323 from each other in the transverse direction Q is equal to the corresponding spacing of the first profile regions 318a from each other, and a spacing of the upper profile bars 323 from each other in the transverse direction Q is equal to the corresponding spacing of the second profile regions 318b from each other.

Each profile region 318a, 318b comprises a depression 19 with a semi-cylindrical inner wall, similar to FIG. 1-2, coaxially with the longitudinal direction L. All the profile regions 318a, 318b in FIG. 3A-3C have an identical cross-section, such that identical profile bars 323 can be used. During travel of the energy chain 10, the runs 12, 14 glide with the corresponding profile regions 318a, 318b on the profile bars 323, i.e. engage with the guide bars 223, such that a deviation of the runs 12, 14 in the transverse direction Q is prevented, possibly assisted by their weight.

Besides the guiding function, the profile bars 323 can have a weight-bearing action, i.e. a support function. In FIG. 3A-3C the upper run 14 is supported by the profile bars 323 movably in a gliding manner in the guide plane 202. The upper run 14 in this case can be supported on the profile bars 323 of the second guide plane 202 by its second profile regions 318b in a gliding manner and guided in a suspended manner, as it were. The construction and installation of the guide strands 32 composed of profile bars 323 here are simple, similarly to FIGS. 1-2, and in particular rapidly alignable with few individual parts.

FIG. 4A shows, by way of example, an add-on module 404 for the device in FIGS. 1-2, in a perspective view from the side facing away from the profile region 18. The add-on module 404 comprises a transversely stabilizing profile region 18, here in the form of a depression 19 with a semi-cylindrical profile surface, which forms a semi-circle in cross-section. In the installed state on the chain link, the cylinder axis of the depression 19 lies parallel to the longitudinal direction L of the energy chain. Furthermore, the add-on module 404 comprises two support skids 405, which extend parallel to the depression 19. The add-on module 404 comprises a locking receptacle and locking projections 407 for locking with narrow sides 409 of a crossbar 424b.

FIG. 4B shows a chain link 44 of an energy chain 10 according to the preceding figures. The chain link 44 comprises two parallel lateral link plates 410, which are connected to each other in the transverse direction Q by at least one, here two, crossbars 424a, 424b. The lateral link plates 410 and the crossbars 424a, 424b define a receiving space 500 for guiding supply lines. The main sides 413 of the lateral link plates 410 in FIG. 4B each have a joint pin 415a that is known per se and a joint receptacle 415b that is known per se for articulated joints with two further chain links 44. Other types of articulated joints are also possible. Each lateral link plate 410 has two narrow sides 411 each extending in the longitudinal direction L, one facing the side A and one facing the side B of the line guiding apparatus 10 inside the line guiding apparatus 10. The crossbars 424a, 424b likewise each have two narrow sides 409, which extend along the transverse direction Q, and two main sides 408, one facing towards and one facing away from the receiving space 500. On the main side facing away from the receiving space 500, one of the crossbars 424a comprises comb-like projections 412, which are injection molded on the crossbar 424a here or may optionally be attached with a separate add-on part. The other, opposite, crossbar 424b of the chain link 44 has on its main side facing away from the receiving space 500 the add-on module 404, as illustrated in FIG. 4B, which is locked with the narrow sides 409 of the crossbar 424. The profile region 18, the support skids 405 and the comb-like projections 412 are arranged externally on the chain link 44 in relation to the receiving space 500 and extend in the longitudinal direction L of the chain link 44.

REFERENCE SIGNS LIST

1 Line guiding system
10 Line guiding apparatus
12 Lower run
13 First connection point
14 Upper run
15 Second connection point
16 Deflection curve
17 Fastening device
18, 318a, 318b Profile region
19 Depression
20, 30 Guiding device
22, 32 Guide strand
23 Support surface
24 Longitudinal portion of a guide strand
31 Installation surface
41, 42, 43, 44 Chain link
111, 211, 311 Retaining surface
201, 202 Guide plane
221 Rope
222 Molded-on profile strands
224 Receptacle
225 Plastics profile
304, 404 Add-on module
323 Profile bar
405 Support skids
407 Locking projections
408 Main side of a crossbar
409 Narrow side of a crossbar
410 Lateral link plate
411 Narrow side a lateral link plate
412 Comb-like projection
413 Main side a lateral link plate
415a, 415b Joint pin, joint receptacle
421, 422, 423, 424a, 424b Crossbar
500 Receiving space
A Side facing towards the deflection axis
B Side facing away from the deflection axis
L Longitudinal direction
Q Transverse direction
H Height direction
U Deflection axis
W Travel path

What is claimed is:

1. A line guiding system comprising:
a line guiding apparatus for dynamic guiding at least one supply line from a first connection point to a second connection point, of which at least one of the first connection point and the second connection point is movable relative to the other of the first connection point and the second connection point along a travel path; and
a separate guiding device for guiding the line guiding apparatus along at least a section of the travel path,
wherein the line guiding apparatus has a longitudinal direction; the line guiding apparatus is formed in an articulated manner such that the line guiding apparatus is turnable around or deflectable for travel, forming two opposite runs and a deflection curve connecting the two opposite runs, the deflection curve is curved about a deflection axis extending in a transverse direction transverse to the longitudinal direction, wherein the guiding device comprises at least one guide strand arrangeable for predefining a desired course of the section of the travel path, wherein the line guiding apparatus comprises external profile regions arranged for lying against and/or on the at least one guide strand, and are shaped with a profile shape for transversely stabilizing guiding against and/or on the at least one guide strand, by projecting and/or recessed interengagement of the at least one guide strand and the profile shape to counteract a lateral deviation of the line guiding apparatus in the transverse direction, wherein the external profile regions are provided on a side of the line guiding apparatus which, during travel of the line guiding apparatus, faces towards a respective opposite run of the two opposite runs, and/or on a side of the line guiding apparatus which, during travel of the line guiding apparatus, faces away from the respective opposite run.

2. The line guiding system according to claim 1, wherein the external profile regions of the line guiding apparatus are formed with a cross-section complementary to a cross-section of the at least one guide strand.

3. The line guiding system according to claim 1, wherein at least some of the external profile regions each have at least one depression extending in the longitudinal direction with a cylindrical inner wall.

4. The line guiding system according to claim 1, wherein:
the at least one guide strand is arrangeable to extend in a linear manner to define a linear course of the section of the travel path and to counteract a deviation of the line guiding apparatus from straight running; and/or
the external profile regions are provided on separate add-on modules, the add-on modules fastened to the line guiding apparatus.

5. The line guiding system according to claim 1, wherein the guiding device comprises a longitudinal portion with at least one supporting guide strand arranged for supporting at least part of a load of the line guiding apparatus.

6. The line guiding system according to claim 1, wherein the at least one guide strand is configured continuously along the section of the travel path.

7. The line guiding system according to claim 6, wherein the at least one guide strand is configured as a rope, wire or cord.

8. The line guiding system according to claim 1, wherein the guiding device comprises at least two fastening devices for the at least one guide strand and the at least one guide strand has two ends, and, in an operational state, the at least one guide strand is fastened at least at the two ends or only at the two ends by one of the fastening devices, in each case.

9. The line guiding system according to claim 1, wherein the line guiding apparatus comprises a plurality of chain links or segments each connected to one another in an articulated manner.

10. The line guiding system according to claim 1, wherein the guiding device comprises two guide planes with at least one guide strand in each of the two guide planes.

11. The line guiding system according to claim 1, wherein the line guiding apparatus is an energy chain having two mutually opposite strands of lateral link plates and crossbars connecting the lateral link plates in the transverse direction, wherein the lateral link plates of each of the two mutually opposite strands are connected to each other in pairs in an articulated manner in each case, wherein the line guiding system comprises add-on modules for retrofitting the energy chain with the external profile regions, wherein the add-on modules each have at least one of the external profile regions, wherein each of the add-on modules is formed for fastening on at least one of the crossbars and/or at least one of the lateral link plates; or at least some of the crossbars and/or at least some of the lateral link plates each have at least one integrated profile region for interaction with the at least one guide strand.

12. The line guiding system according to claim 11, wherein the energy chain forms during travel the two opposite runs and the deflection curve connecting the two opposite runs, wherein the add-on modules are arranged externally on a facing away side of the energy chain, which, during travel, faces away from the opposite run in each case or faces away from the deflection axis of the deflection curve.

13. The line guiding system according to claim 12, wherein an add-on module comprises external profile regions facing, during travel, towards one run of the two opposite runs or the deflection axis, and external profile regions facing, during travel, away from the one run of the two opposite runs or the deflection axis.

14. The line guiding system according to claim 1, wherein:
the two opposite runs of the line guiding apparatus comprise a stationary run and a movable run,
the external profile regions of the line guiding apparatus comprise first profile regions and second profile regions,
the at least one guide strand of the guiding device comprises a first pair of parallel guide strands in a form of profile bars for guiding the stationary run, and a second pair of parallel guide strands in a form of profile bars for guiding and supporting the movable run, wherein the stationary run and the movable run each comprises the first profile regions arranged in pairs and symmetrically in cross-section, wherein the first profile regions, during travel, face away from one run of the two opposite runs in each case, and the second profile regions arranged in pairs and symmetrically in cross-section, wherein the second profile regions, during travel, face towards the one run of the two opposite runs in each case, and
the first profile regions interact with the first pair of profile bars and the second profile regions interact with the second pair of profile bars.

15. The line guiding system according to claim 1, wherein the at least one guide strand is configured as a profile strand.

16. The line guiding system according to claim 15, wherein the line guiding apparatus comprises a plurality of comb-like projections extending in the longitudinal direction on a side of each of the two opposite runs facing, during travel, towards one run of the two opposite runs in each case, to allow the comb-like projections of the two opposite runs to mesh with one another during travel in order to keep the two opposite runs together against a transverse shift relative to each other or together laterally.

17. The line guiding system according to claim 16, wherein:
the two opposite runs are a lower run and an upper run,
the lower run during travel is guided by interaction of an allocated guide strand with external profile regions that are arranged externally on a facing away side of the energy chain facing away from the upper run; and/or the upper run during travel is guided by interaction of the at least one guide strand being configured as the profile strand with the comb-like projections.

18. The line guiding system according to claim 17, wherein the at least one guide strand for the upper run configured as the profile strand is retained laterally on the guide strand allocated to the lower run, wherein the guide strand allocated to the lower run is a rope.

19. A chain link of an energy chain for the line guiding system according to claim 1, wherein the energy chain is formed in the articulated manner for dynamic guiding of at least one supply line to a movable consumer, such that the energy chain is turnable around or deflectable and forms during travel the two opposite runs and the deflection curve which is curved about the deflection axis and connects the two opposite runs, the chain link comprising two lateral link plates opposite each other in the transverse direction, each of the two lateral link plates having two narrow sides extending in the longitudinal direction, and at least one crossbar connecting the two lateral link plates, wherein the two lateral link plates and the at least one crossbar define a receiving space for the at least one supply line to be guided, wherein a respective lateral link plate is formed to be connected to the two lateral link plates of neighboring chain links, pivotably relative to each other about a pivot axis which extends in the transverse direction, wherein the chain link comprises at least one external profile region facing away from the receiving space for interacting with at least one rope- or bar-like guide strand, wherein the at least one external profile region is arranged on the at least one crossbar and/or on at least one of the two narrow sides of a particular lateral link plate of the two lateral link plates, wherein, in respect to the pivot axis, the at least one external profile region of the chain link is arranged on a radially inner side or a radially outer side of the chain link and has a profile shape complementary in cross-section to the rope- or bar-like guide strand.

20. The chain link according to claim 19, wherein the profile region is shaped integrally with an external side of the crossbar, wherein the profile region is formed on the crossbar, or is latched with the crossbar as a component of a separate add-on module.

* * * * *